(12) United States Patent
Kim et al.

(10) Patent No.: US 7,864,804 B2
(45) Date of Patent: Jan. 4, 2011

(54) APPARATUS AND METHOD FOR CONNECTION ADMISSION CONTROL IN BROADBAND WIRELESS ACCESS SYSTEM

(75) Inventors: Ki-Back Kim, Seongnam-si (KR); Eun-Chan Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 12/265,826

(22) Filed: Nov. 6, 2008

(65) Prior Publication Data

US 2009/0116384 A1 May 7, 2009

(30) Foreign Application Priority Data

Nov. 7, 2007 (KR) .................. 10-2007-0113100

(51) Int. Cl.
*H04J 3/16* (2006.01)
(52) U.S. Cl. .................. 370/469; 370/231; 370/232; 709/226
(58) Field of Classification Search .................. None
See application file for complete search history.

(56) References Cited

U.S. PATENT DOCUMENTS

| | | | | |
|---|---|---|---|---|
| 6,640,248 | B1* | 10/2003 | Jorgensen | 709/226 |
| 7,251,218 | B2* | 7/2007 | Jorgensen | 370/235 |
| 2007/0116004 | A1* | 5/2007 | Kang et al. | 370/395.2 |
| 2007/0253332 | A1* | 11/2007 | Fawaz et al. | 370/230 |
| 2010/0004012 | A1* | 1/2010 | Ananthanarayanan et al. | 455/518 |

FOREIGN PATENT DOCUMENTS

EP 0 917 316 A2 5/1999

OTHER PUBLICATIONS

Kamal Gakhar; IROISE: A New QoS Architecture for IEEE 802.16 and IEEE 802.11e Interworking, Oct. 7, 2005; pp. 607-612.*
Mario Marchese; Optimal Bandwidth Provision at WiMAX MAC Service Access Point on Uplink Direction, Jun. 24, 2007, pp. 80-85.*
Sayenko, Alexander et al., Scheduling solution for the IEEE 802.16 base station, Oct. 1, 2007, pp. 96-115.
Alexander Sayenko et al, Scheduling solution for the IEEE 802.16 base station, ScienceDirect Info Site, Oct. 1, 2007, IEEE 802.16 WiMAX, Elsevier B.V.

* cited by examiner

*Primary Examiner*—Seema S Rao
*Assistant Examiner*—Rhonda Murphy
(74) *Attorney, Agent, or Firm*—Jefferson IP Law, LLP

(57) ABSTRACT

An apparatus and method for Connection Admission Control (CAC) in a Broadband Wireless Access (BWA) system are provided. In the method, a QoS class of a call requesting connection admission is detected and an application layer required bandwidth is determined using the QoS parameters of a service flow of the detected QoS class. A required bandwidth weight of the QoS class is determined in consideration of a packet header overhead. Per-slot available bandwidths of a reference QoS class and the QoS class are determined using the determined application layer required bandwidth, and a required bandwidth conversion ratio of a corresponding QoS class is determined using the determined per-slot available bandwidths. An equivalent MAC layer required bandwidth is determined using the determined application layer required bandwidth, the required bandwidth weight, and the required bandwidth conversion ratio.

24 Claims, 5 Drawing Sheets

APPARATUS AND METHOD FOR CONNECTION ADMISSION CONTROL IN BROADBAND WIRELESS ACCESS SYSTEM

PRIORITY

This application claims the benefit under 35 U.S.C. §119 (a) of a Korean patent application filed in the Korean Intellectual Property Office on Nov. 7, 2007 and assigned Serial No. 10-2007-0113100, the entire disclosure of which is hereby incorporated by reference.

BACKGROUND OF THE INVENTION

1. Field of the Invention

The present invention relates to a Broadband Wireless Access (BWA) system. More particularly, the present invention relates to an apparatus and method for Connection Admission Control (CAC) considering traffic characteristics.

2. Description of the Related Art

In a wireless access system, when limited network resources are available for distribution to a plurality of user terminals, the number of access connections (or the amount of traffic) must be restricted to ensure Quality of Service (QoS). To this end, Connection Admission Control (CAC) is used to determine whether to admit or deny access by a terminal that is requesting connection (i.e., a connection admission requesting connection) or requesting a connection for a QoS requirement change (e.g., a per-flow mode change) in consideration of currently available resources.

FIG. 1 is a diagram illustrating a general concept of a conventional CAC.

According to a conventional CAC algorithm, when a connection admission request is received from a user terminal, a wireless access system estimates an available channel capacity (having the same unit as a bandwidth or a transmission rate). Thereafter, the wireless access system compares the estimated available channel capacity with a bandwidth requirement for input traffic (i.e., a transmission request rate for a connection corresponding to the connection admission request of the user terminal) to determine whether to admit or deny the requested connection of the user terminal. For example, if the transmission request rate is less than the available channel capacity, the wireless access system admits the connection of the user terminal. If not, the wireless access system denies the connection of the user terminal. Thus, the core issues of the CAC are to provide a method of estimating the available channel capacity and a method of specifying the bandwidth requirement for input traffic.

In the conventional circuit-based wireless networks (e.g., Code Division Multiple Access (CDMA) and Global System for Mobile communications (GSM)), because a per-connection required capacity and a radio channel capacity are constant, a CAC process is performed in consideration of only the number of currently-served connections. However, in the third-generation or later wireless networks such as the World interoperability for Microwave Access (WiMAX) and the Third-Generation Partnership Project 2 (3GPP2), because the advanced access techniques (e.g., Adaptive Modulation and Coding (AMC), Hybrid Automatic Repeat reQuest (HARQ), Proportional Fair (PF) Scheduling, and Multi Input Multi Output (MIMO)) are used selectively according to the respective traffic characteristics, an available channel capacity changes dynamically and is thus difficult to estimate.

Also, the amount of radio resources used to secure the same required bandwidth varies with the traffic types. For example, although Voice-over-Internet Protocol (VoIP), multimedia streaming, and File Transfer Protocol (FTP) download application programs require the same bandwidth of 64 Kbps, the amounts of radio resources used to serve them differ from each other.

Furthermore, in the advanced wireless network, an air resource allocation method of a downlink (DL) is different from an air resource allocation method of an uplink (UL). Thus, although the QoS types are the same, the amount of air resources used in the DL are different from the amount of air resource used in the UL. For example, for an Unsolicited Grant Service (UGS), the UL allocates air resources periodically regardless of whether traffic has arrived. However, the DL does not allocate air resources in advance, but allocates air resources when traffic has arrived. Therefore, a wider bandwidth must be allocated to the UL than to the DL in consideration of a waste of air resources. In the case of the UL, a waste of air resources must be considered in allocation of radio resources because a bandwidth request process is included for all the QoS types except the UGS. In the case of a real-time Polling Service (rtPS), a DL resource waste occurs due to a polling operation for a UL flow because the UL performs a polling operation but the DL does not perform a polling operation. User terminals have different Modulation and Coding Scheme (MCS) levels due to an AMC function used in the advanced wireless network, although it is a minute difference in overhead. A MAC overhead for the DL can be reduced by scheduling user terminals with the same MCS level in one burst, but it is difficult to do this for the UL, causing a further resource waste due to the overhead. Overall, a waste of DL/UL air resources occurs in a UL flow.

Application programs with various traffic characteristics (e.g., real-time vs. non-real-time, and fixed data rate vs. variable data rate) are present in the third-generation or later wireless networks. Thus, a method for clearly specifying the characteristics of input traffic is required in order to effectively support such application programs.

SUMMARY OF THE INVENTION

An aspect of the present invention is to address at least the above-mentioned problems and/or disadvantages and to provide at least the advantages described below. Accordingly, an aspect of the present invention is to provide an apparatus and method for CAC in a BWA system.

Another aspect of the present invention is to provide an apparatus and method for performing a CAC process in a BWA system by determining an equivalent required bandwidth and equivalent available bandwidth on the basis of a reference QoS class in consideration of the traffic characteristics of various QoS classes and comparing the determined equivalent required bandwidth with the determined equivalent available bandwidth.

Still another aspect of the present invention is to provide an apparatus and method for determining an application layer required bandwidth in a BWA system by using QoS parameters defined in the IEEE 802.16 standard.

Even another aspect of the present invention is to provide an apparatus and method in a BWA system for determining a packet header overhead and a signal overhead in consideration of QoS classes and application characteristics and determining a MAC layer required bandwidth and an available bandwidth in consideration of the determined overheads.

Yet another aspect of the present invention is to provide an apparatus and method in a BWA system for defining a per-slot available bandwidth for each QoS class and using the defined per-slot available bandwidth to convert a MAC layer required bandwidth of a connection-requesting service flow into an equivalent MAC layer required bandwidth of a reference QoS class.

According to an aspect of the present invention, a method for CAC in a BWA system is provided. The method includes detecting a QoS class of a call requesting connection admission and determining an application layer required bandwidth by using the QoS parameters of a service flow of the detected QoS class, determining a required bandwidth weight of the QoS class in consideration of a packet header overhead, determining per-slot available bandwidths of a reference QoS class and the QoS class by using the determined application layer required bandwidth, determining a required bandwidth conversion ratio of a corresponding QoS class by using the determined per-slot available bandwidths and determining an equivalent MAC layer required bandwidth by using the determined application layer required bandwidth, the required bandwidth weight, and the required bandwidth conversion ratio.

According to another aspect of the present invention, an apparatus for CAC in a BWA system is provided. The apparatus includes a controller for determining whether there is a call requesting connection admission and a CAC processor for detecting a QoS class of the call requesting connection admission and for determining an application layer required bandwidth by using the QoS parameters of a service flow of the detected QoS class.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Also, the terms used herein are defined according to the functions of the present invention. Thus, the terms may vary depending on user's or operator's intentions or practices. Therefore, the terms used herein must be understood based on the descriptions made herein.

Exemplary embodiments of the present invention provide a CAC apparatus and method for considering traffic characteristics in a BWA system. Accordingly, while the following description is made in the context of an OFDMA-based mobile WiMAX system, it is to be understood that application of the present invention is not so limited. Thus, it should be clearly understood that the present invention is also applicable to any other wireless communication system that supports traffic with various characteristics.

Also, the following description is made in the context of a CAC scheme for determining whether to admit a connection for a new call, to which the present invention is not limited. Thus, it should be clearly understood that the present invention is also applicable to any other CAC scheme for determining whether to admit a connection for a QoS requirement change (e.g., a per-flow mode change) and the like.

Figure 1:
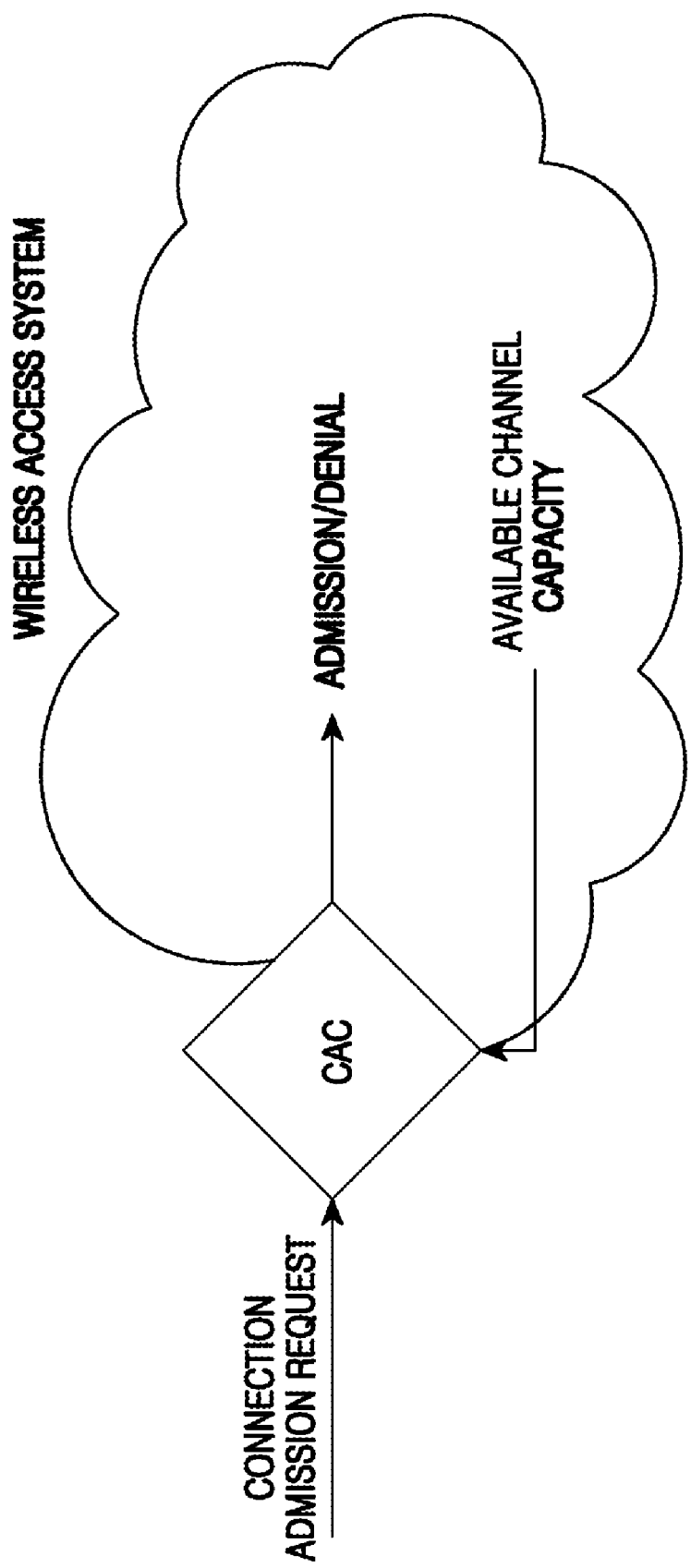
FIG. 1 is a diagram illustrating a general concept of a conventional CAC.
Figure 2:
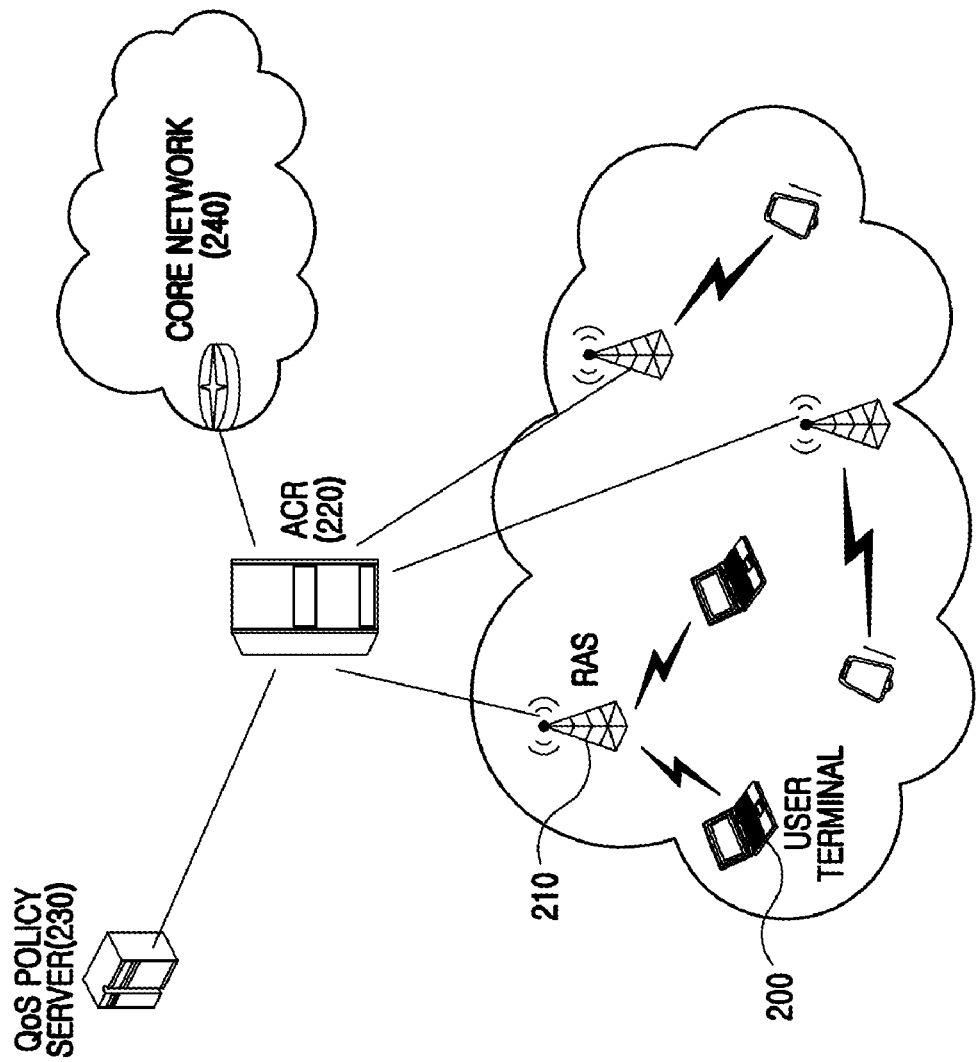
FIG. 2 is a diagram illustrating a network configuration according to an exemplary embodiment of the present invention.

FIG. 2 is a diagram illustrating a network configuration according to an exemplary embodiment of the present invention.

Referring to FIG. 2, the network includes a QoS policy server 230, an Access Control Router (ACR) 220, a Radio Access Station (RAS) 210, and a user terminal 200. Herein, the RAS may also be referred to as Base Station (BS), and the ACR may also be referred to as Access Service Network-GateWay (ASN-GW). Also, a network including the RAS 210 and the ACR 220 may be defined as an Access Service Network (ASN). Herein, the name of a Network Entity (NE) is defined according to its function and may vary depending on the intentions of users or operators.

The QoS policy server 230 performs authentication and payment processes for a user terminal 200 in cooperation with the ASN. When the authentication of the MS is successful, the QoS policy server 230 determines a policy to be applied to the user terminal 200 and transmits the determination result to the ASN. Then, the ASN controls a Service Flow (SF) of the user terminal 200 according to the determined policy.

The ACR 220 transmits traffic received from a Core Network (CN) 240 to the corresponding RAS 210, and transmits traffic received from the RAS 210 to the CN 240. Herein, the ACR 220 manages the SF, the connection, and the mobility of each user terminal, and generates an SF for each UpLink (UL) and DownLink (DL) connection.

The RAS 210 transmits traffic received from the ACR 220 to the user terminal 200, and transmits traffic received from the user terminal 200 to the ACR 220. Herein, the RAS 210 is connected to the ACR 220 through a wired link, and is connected to the user terminal 200 through a wireless link. The RAS 210 performs scheduling according to the QoS parameters of an SF of a Media Access Control (MAC) layer, and allocates resources to the user terminal 200. Upon receiving a connection admission request from the user terminal 200, the RAS 210 uses the QoS parameters of a corresponding SF to determine an application layer required bandwidth, determines a packet header overhead and a per-slot available bandwidth, and uses the application layer required bandwidth, the packet header overhead and the per-slot available bandwidth to determine an equivalent MAC layer required bandwidth for a reference QoS class. Also, the RAS 210 determines a signal overhead, determines an equivalent available bandwidth, and uses the equivalent MAC layer required bandwidth and the equivalent available bandwidth to determine whether to admit the connection.

Figure 3:
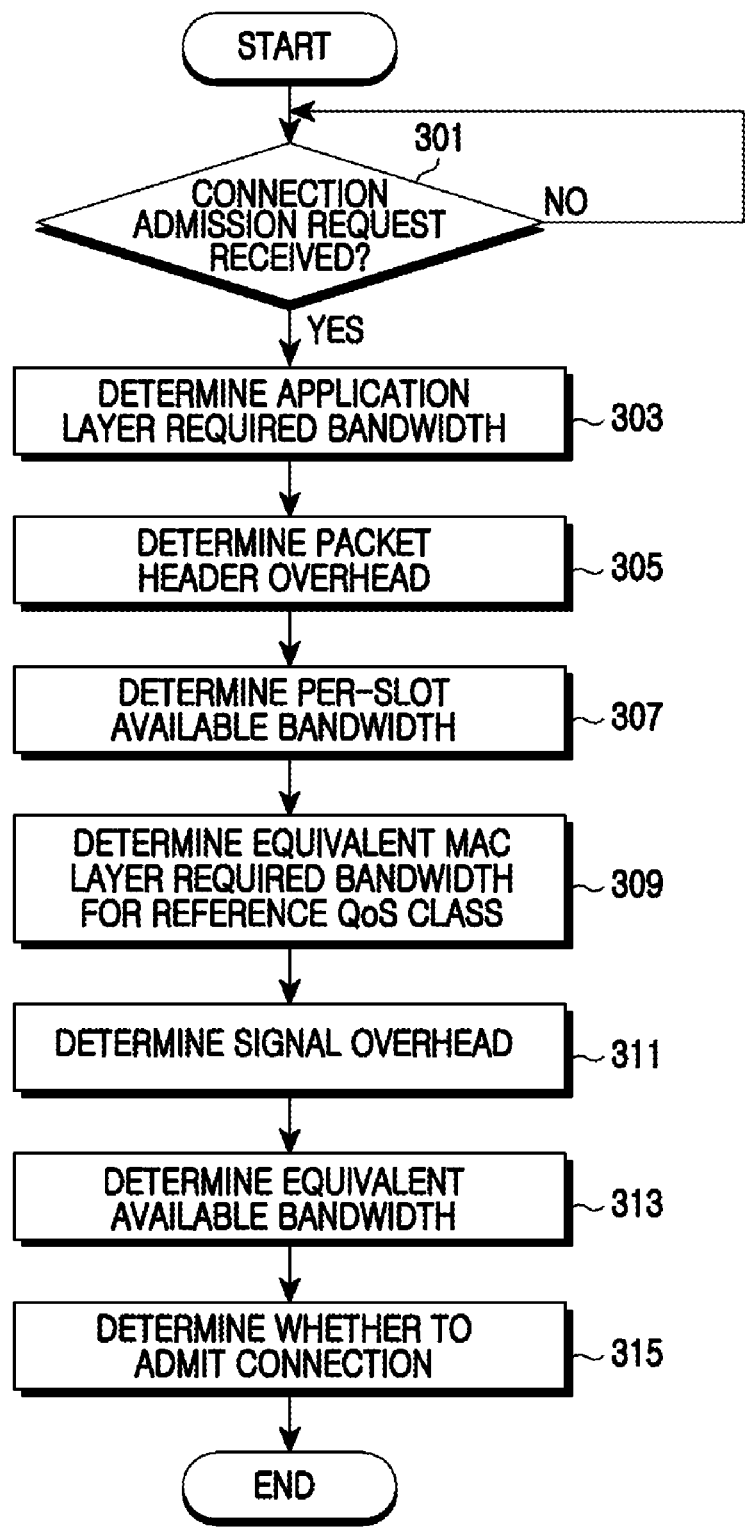
FIG. 3 is a flowchart illustrating a CAC process of an RAS in a BWA system according to an exemplary embodiment of the present invention.

FIG. 3 is a flowchart illustrating a CAC process of an RAS in a BWA system according to an exemplary embodiment of the present invention.

Referring to FIG. 3, in step 301, an RAS determines whether a connection admission request for a new call is received. That is, the RAS determines whether a new call desires connection. If a connection admission request for a new call is received in step 301, the RAS detects a QoS class of the new call and determines an application layer required bandwidth for the detected QoS class by using the QoS parameters of a corresponding SF in step 303. The term "application layer required bandwidth" denotes a transmission rate in a pure application program layer except a packet header overhead of each layer such as Transmission Control Protocol (TCP)/User Datagram Protocol (UDP), Internet Protocol (IP), and Medium Access Control (MAC), and examples of the typical IEEE 802.16e parameters include Maximum Sustained Traffic Rate, Minimum Reserved Traffic Rate, and Maximum Burst Size.

The application layer required bandwidth for each QoS class is determined as follows. Herein, four cases of Unsolicited Grant Service (UGS), extended real-time Polling Service (ertPS), real-time Polling Service (rtPS), and non-real-time Polling Service (nrtPS) are considered according to the IEEE 802.16e standard. The Best Effort (BE) service is not a CAC target.

The UGS is applied for service of a Constant Bit Rate (CBR) application program that generates a packet of a certain size at certain periods. In this case, because the transmission rate is constant, a QoS policy server sets a maximum sustained traffic rate of a UGS connection on the basis of the required transmission rate of the CBR application program and the RAS determines an application layer required bandwidth of the UGS connection on the basis of the maximum sustained traffic rate.

The ertPS is used for a Voice-over-Internet Protocol (VoIP) application program with a silence removal function. In general, a VoIP application program without a silence removal function is encoded at a fixed rate and served through a UGS connection, whereas a VoIP application program with a silence removal function is served through an ertPS connection in order to prevent unnecessary bandwidth allocation during the silence period. The QoS policy server sets the ertPS to be used only for a VoIP application program with a silence removal function, and determines the statistic average of the ratio of silence time to non-silence time (i.e., talk time). The RAS may determine the application layer required bandwidth of the ertPS connection by a formula of (Talk Time× Maximum Sustained Traffic Rate). In another method, the QoS policy server sets a minimum reserved traffic rate of an ertPS connection to an average required transmission rate for the VoIP traffic with a variable transmission rate in the non-silence period and the RAS determines an application layer required bandwidth of the ertPS connection on the basis of the minimum reserved traffic rate.

The rtPS is applied for service of a Variable Bit Rate (VBR) real-time traffic (e.g., Moving Picture Experts Group (MPEG) video), and the core QoS parameters of the rtPS are Maximum Sustained Traffic Rate, Minimum Reserved Traffic Rate, and Maximum Burst Size. Whether to admit a connection is determined on the basis of an average required bandwidth of each input traffic and an average available bandwidth of the current system, and therefore the Maximum Burst Size and the Maximum Sustained Traffic Rate are not very important QoS parameters in CAC. The QoS policy server sets a minimum reserved traffic rate of an rtPS connection to an average required transmission rate of a VBR real-time application program, and the RAS determines an application layer required bandwidth of the rtPS connection on the basis of the minimum reserved traffic rate.

The nrtPS is applied for service of a non-real-time traffic that has a higher priority than a BE traffic, and the core QoS parameters of the nrtPS are Maximum Sustained Traffic Rate, Minimum Reserved Traffic Rate, and Maximum Burst Size. Because the service quality of an nrtPS connection is greatly affected by the minimum transmission rate, the QoS policy server sets a minimum reserved traffic rate of an nrtPS connection to a minimum required transmission rate of the non-real-time traffic and the RAS determines an application layer required bandwidth of the nrtPS connection on the basis of the minimum reserved traffic rate. Most non-real-time traffic uses TCP as transmission protocol and thus their transmission rates depend on TCP. The transmission rate increases above the minimum required transmission rate if there are many available resources in a communication network after connection admission, and the set minimum required transmission rate is secured if there are few available resources.

The determined application layer required bandwidth is simply a required bandwidth of an application layer, and overheads in various layers (e.g., TCP/UDP, IP, and MAC layers) must be considered in order to determine an equivalent MAC layer required bandwidth to be used in CAC. Thus, in step 305, the RAS determines a packet header overhead that is necessary when a corresponding SF is admitted. Herein, the packet header overhead is an overhead contained in a data burst, i.e., a Protocol Data Unit (PDU) overhead, examples of which include Generic MAC Header (GMH), Cyclic Redundancy Check (CRC), Packing Sub-Header (PSH), Fragmentation Sub-Header (FSH), and Traffic Encryption Key (TEK). The packet header overhead is determined in consideration of application characteristics.

In determining the equivalent MAC layer required bandwidth, consideration of the fact that there is a difference between the sizes of communication network resources used to secure the application layer required transmission rates of a real-time traffic and a non-real-time traffic is more important than consideration of the overhead. For example, the size of a communication network resource used to stably serve a 100 kbps real-time traffic is much larger than the size of communication network resource used to serve a 100 kbps non-real-time traffic. This difference is due to a difference between the access techniques used to secure the service quality for the respective traffic types. In the case of real-time traffic, because the service quality is sensitive to a transmission delay, the use of retransmission mechanisms such as Hybrid Automatic Retransmission reQuest (HARQ) and Automatic Retransmission reQuest (ARQ) is restrictive and a scheduling operation must be performed in a round-robin fashion. In the case of non-real-time traffic, because the service quality is not as sensitive to a transmission delay, a retransmission mechanism is used and a scheduling operation is performed in a proportional-fair fashion, thus making it possible to enhance the total sector processing capacity.

When performing a CAC process under the condition of the mixed existence of real-time traffic and non-real-time traffic, exemplary embodiments of the present invention convert the required bandwidth of non-real-time traffic on a real-time basis in order to solve the problem of a capacity difference due to a difference between the access techniques used for the respective traffic. For example, non-real-time traffic requiring a transmission rate of 100 kbps is equivalently considered as real-time traffic requiring a transmission rate of 40 kbps. The important point for this is how to determine a required bandwidth conversion ratio. In step 307, the RAS determines a per-slot available bandwidth of the corresponding QoS class to determine the required bandwidth conversion ratio.

Herein, the number of slots, which are used to serve all SFs of a corresponding QoS class (e.g., UGS, ertPS, rtPS, and nrtPS) during a time period given when transmitting a MAC frame from a modem by air, is defined as n(QoS_class), and the n(QoS_class) is used to determine a per-slot available bandwidth as Equation (1):

$$\Delta C(\text{QoS\_class}) = \frac{\sum_i BW_{req}(i)}{n(\text{QoS\_class})} \quad (1)$$

where $\Delta C(\text{QoS\_class})$ denotes a per-slot available bandwidth of a corresponding QoS class, $BW_{req}$ denotes an application layer required bandwidth [bit/sec], $$\sum_i BW_{req}(i)$$

denotes the sum of the application layer required bandwidths of all SFs of a corresponding QoS class that is being served as a result of CAC, and i denotes a service flow index.

Herein, a required bandwidth conversion ratio for a reference QoS class may be determined using Equation (1). For example, the UGS supporting a real-time traffic is set as the reference QoS class, and the required bandwidth conversion ratio for the reference QoS class is determined as Equation (2):

$$\beta(\text{QoS\_class}) = \frac{\Delta C(\text{QoS\_class})}{\Delta C(\text{reference QoS\_class})} \quad (2)$$

where $\beta(\text{QoS\_class})$ denotes a required bandwidth conversion ratio of a corresponding QoS class and $\Delta C(\text{reference QoS\_class})$ denotes a per-slot available bandwidth of the reference QoS class.

An important step in the present invention is to set a CAS available threshold to one QoS type. To this end, the air resource requirements for other QoS types must be converted on the basis of the reference QoS type. In the above exemplary embodiment, the UGS is set as the reference QoS type to perform the conversion.

In step 309, the RAS uses the packet header overhead and the per-slot available bandwidth to determine an equivalent MAC layer required bandwidth on the basis of the reference QoS class. The equivalent MAC layer required bandwidth is determined as Equation (3):

$$C_{eq} = BW_{req} * (1 + \alpha(\text{application SF}))/\beta(\text{QoS\_class}) \quad (3)$$

where $C_{eq}$ denotes an equivalent MAC layer required bandwidth and $\alpha(\text{application SF})$ denotes a required bandwidth weight corresponding to a packet header overhead of a corresponding QoS class, which is greater than 0.

In Equation (1), $\alpha(\text{application SF})$ is determined in consideration of the packet header overhead and the characteristics of the corresponding QoS class. The value of an application layer required bandwidth and a padding overhead must also be considered in determination of $\alpha(\text{application SF})$, which may be determined using the ratio of the size of a PDU with various packet header overheads to the size of a pure application layer payload without various packet header overheads.

Not only the equivalent MAC layer required bandwidth but also an equivalent available bandwidth is necessary to determine whether to admit the connection of the new call. The equivalent available bandwidth is the total capacity of a sub-cell usable by QoS SFs, i.e., the capacity usable by pure bearer traffic except signaling traffic.

Thus, in step 311, the RAS determines a signal overhead necessary for admission of a corresponding SF in order to determine the equivalent available bandwidth. Examples of the signal overhead include a bandwidth requesting/polling overhead and ARQ/HARQ overhead, which is determined in consideration of the QoS class. In the case of the UGS, a bandwidth requesting overhead is generated only once at the first time. In the case of the rtPS, a polling overhead is generated periodically. In the case of the nrtPS used for non-real-time traffic transmission, an ARQ overhead is generated additionally.

A Multicast and Broadcast Service (MBS) supporting overhead and a sleep or idle mode user supporting overhead are examples of the signal overhead necessary for admission of the SF. A preamble of a fixed size, DL/UL MAP, and a broadcasting message necessary for a network operation (e.g., Downlink Channel Descriptor (DCD), Uplink Channel Descriptor (UCD), and Neighbor ADVertisement (NBR-ADV)) are included in the signal overhead for DL. A UL control channel fixedly allocated and signaling traffic (e.g., a bandwidth allocation request, Dynamic Service Add (DSA)/Dynamic Service Change (DSC)/Dynamic Service Deletion (DSD), RObust Header Compression (ROHC) feedback signals, and ARQ ACK) are included in the signal overhead for UL.

In step 313, the RAS uses the determined signal overhead to determine an equivalent available bandwidth. The equivalent available bandwidth is determined by excluding, from the entire slots, a slot allocated to the determined signal overhead and a slot allocated to a data burst of all the QoS SFs except BE as Equation (4):

$$DL: Na_d = Nt_d - (No_{d1} + No_{d2} + No_{d3}) - Nd_d$$

$$UL: Na_u = Nt_u - (No_{u1} + No_{u2}) - Nd_u \quad (4)$$

where $Na_d$ denotes a DL available bandwidth (i.e., the amount of air resource (e.g., the number of slots) available in a DL interval), $Na_u$ denotes a UL available bandwidth (i.e., the amount of air resource (e.g., the number of slots) available in a UL interval), $Nt_d$ and $Nt_u$ respectively denote the number of the entire slots defined for DL and UL, which have fixed values according to a permutation scheme, $Nd_d$ and $Nd_u$ respectively denote the number of slots allocated to a data burst of all the QoS SFs except BE for DL and UL, $No_{d1}$, $No_{d2}$ and $No_{d3}$ denote the number of slots allocated to a signal overhead for DL, and $No_{u1}$ and $No_{u2}$ denote the number of slots allocated to a signal overhead for UL.

In Equation (4), $No_{d1}$ denotes the number of slots allocated to an MBS. In most cases, an air resource of a certain size (expressed in units of slot) is allocated fixedly in a DL frame regardless of the number of users. Therefore, the RAS can easily determine an air resource allocated to the MBS. $No_{d2}$ denotes the number of slots allocated to a preamble of a fixed size, DL/UL MAP varying according the number of users, a broadcasting message necessary for a network operation (e.g., DCD, UCD, and NBR-ADV). In most cases, for Partial Usage of SubCarrier (PUSC), an available slot fails to be allocated to a data burst due to difficulty in implementing an RF scheduler. In this case, it is assumed that an overhead does not increase because the size of DL/UL MAP may not increase due to an increase in the number of users. $No_{d3}$ is an air resource allocated to a sleep or idle mode user, which is typically used by TRaFfic INDication (TRF-IND) and PAGing ADVertisement (PAG-ADV). $No_{u1}$ is a slot allocated to a UL control channel, and $No_{u2}$ is a slot allocated to other signaling traffic such as a bandwidth allocation request, DSA/DSC/DSD, ROHC feedback signals, and ARQ ACK.

Herein, the determined available bandwidth is used to determine an equivalent available bandwidth for the reference QoS class as Equation (5):

$$C_a = N_a * \Delta C(\text{reference } QoS\_\text{class}) \quad (5)$$

where $C_a$ denotes an equivalent available bandwidth and $N_a$ denotes an available bandwidth for DL or UL that corresponds to $Na_d$ or $Na_u$.

Accordingly, different available bandwidths for the respective QoS classes can be represented on the basis of the reference QoS class.

A scheduler in the RAS reports an available bandwidth periodically according to the request of a CAC processor. To this end, the scheduler uses Spare_Capacity_Req and Spare_Capacity_Rpt defined in the WiMAX Network Working Group (NWG). For example, the scheduler reports the amount of available radio resource to the CAC processor through an available radio resource DL/UL IE of an available bandwidth response message (Spare_Capacity_Rpt) at every Radio Resource Management (RRM) averaging time period of an RRM R4 available bandwidth request message (Spare_Capacity_Req). The available radio resource DL/UL IE is defined to express the amount of the available radio resource as a value between 0 to 100 by 8 bits. Therefore, the scheduler expresses the amount of the available radio resource in a percent (%) of the division of the number of available slots by the number of the entire slots (i.e., $p_a = Na/Nt*100$), which was determined through Equation (4). Using the reported available radio resource amount and the total slot number reported through the total slot IEs, the CAC processor determines an equivalent available bandwidth on the basis of the reference QoS class. Accordingly, Equation (5) is expressed as Equation (6):

$$C_a = Nt * p_a / 100 * \Delta C(\text{reference } QoS\_\text{class}) \quad (6)$$

where $C_a$ denotes an equivalent available bandwidth, Nt denotes the total number of slots for DL or UL that corresponds to $Nt_d$ or $Nt_u$, and $p_a$ denotes the amount of the available radio resource.

In step 315, the RAS uses the determined equivalent MAC layer required bandwidth and the determined equivalent available bandwidth to determine whether to admit the connection. If Equation (7) below is satisfied, the RAS admits the connection of a corresponding call. If not, the RAS denies the connection of the corresponding call.

$$C_{eq} < KC_a \quad (7)$$

where $C_{eq}$ denotes an equivalent MAC layer required bandwidth, $C_a$ denotes the equivalent available bandwidth, and K is a constant value smaller than 1, which is set differently depending on the QoS class of a corresponding call and whether the corresponding call is a new call or a handover call.

The equivalent available bandwidth $C_a$ and the equivalent MAC layer required bandwidth $C_{eq}$ are determined for DL or UL depending on the direction of a connection-requiring call. The constant K is set differently depending on the QoS class of a corresponding call and whether the corresponding call is a new call or a handover call. That is, the K value of a QoS class with a high priority is set to be greater than the K value of a QoS class with a low priority, thereby making it possible to provide differentiation according to the priority for connection admission. Also, the K value for a handover call is set to be greater than the K value for a new call, thereby making it possible to protect the handover call, reduce the call dropping probability, and enhance the service quality. The reason for protecting the handover call is that a user feels a service quality degradation more sensitively in the event of a call dropping phenomenon that a pre-existing call is dropped due to a handover, than in the event of a call blocking phenomenon that connection of a new call is denied.

Thereafter, the RAS ends the CAC process according to an exemplary embodiment of the present invention.

Steps 303 to 309 are a group of steps for determining the equivalent MAC layer required bandwidth, and steps 311 and 313 are a group of steps for determining the equivalent available bandwidth. Thus, the two groups may be performed in parallel when connection of a new call is requested. Also, the packet header overhead in step 305 and the signal overhead in step 311 may be determined beforehand in an off-line manner regardless of the occurrence of a connection admission request event in step 301, so that they can have fixed values. Also, the equivalent available bandwidth in step 313 may have a value that is periodically updated regardless of the occurrence of a connection admission request event in step 301, so that it can use the value when the connection admission request event occurs.

Figure 4:
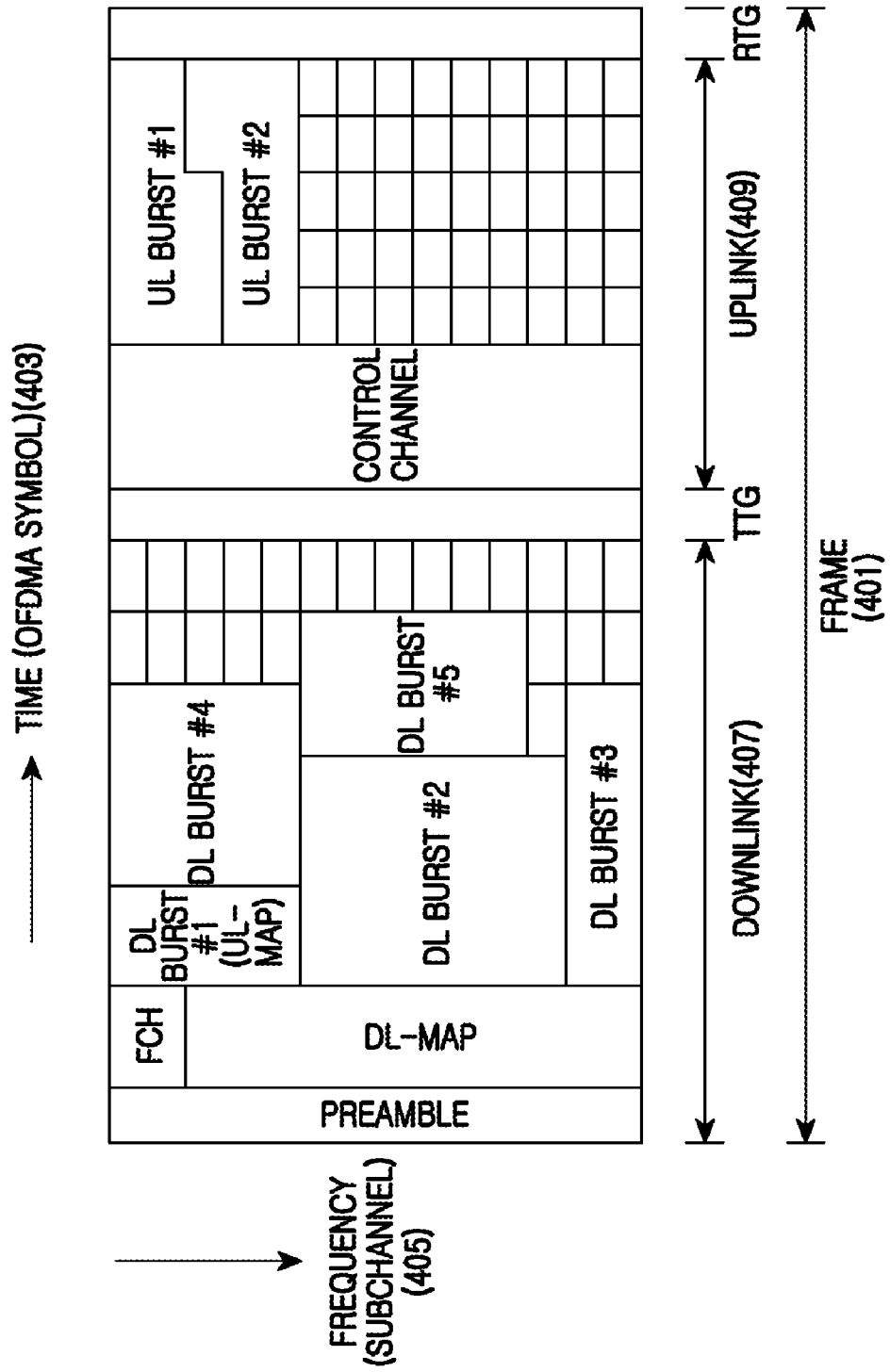
FIG. 4 is a diagram illustrating a frame structure for an OFDMA-based BWA system according to an exemplary embodiment of the present invention.

FIG. 4 is a diagram illustrating a frame structure for an OFDMA-based BWA system according to an exemplary embodiment of the present invention.

Referring to FIG. 4, a frame 401 is defined in a two-dimensional domain composed of a time domain (OFDMA symbol) 403 and a frequency domain (subchannel) 405. The time domain is divided into a DL frame 407 and a UL frame 409. The DL frame 407 includes a preamble, a Frame Control Header (FCH), a DL-MAP, a UL-MAP, and DL bursts. The UL frame 409 includes a control channel and UL bursts. The preamble is used to acquire initial synchronization and to search for a cell. The FCH contains information for describing a basic structure of a frame. The DL-MAP contains information indicating a DL burst region, and the UL-MAP contains information indicating a UL burst region. The control channel may include a ranging channel, a Channel Quality Indicator Channel (CQICH), an Acknowledgement Channel (ACKCH), and a sounding channel.

In this frame structure, the minimum unit of resource allocation is a slot which is configured differently according to permutation schemes. Configuration of a slot composed of a subchannel and an OFDMA symbol and the number of subcarriers constituting one slot are defined in the IEEE 802.16 standard. The total number of slots constituting one frame is determined according to these definitions. A burst is a group of slots having the same MCS level.

Figure 5:
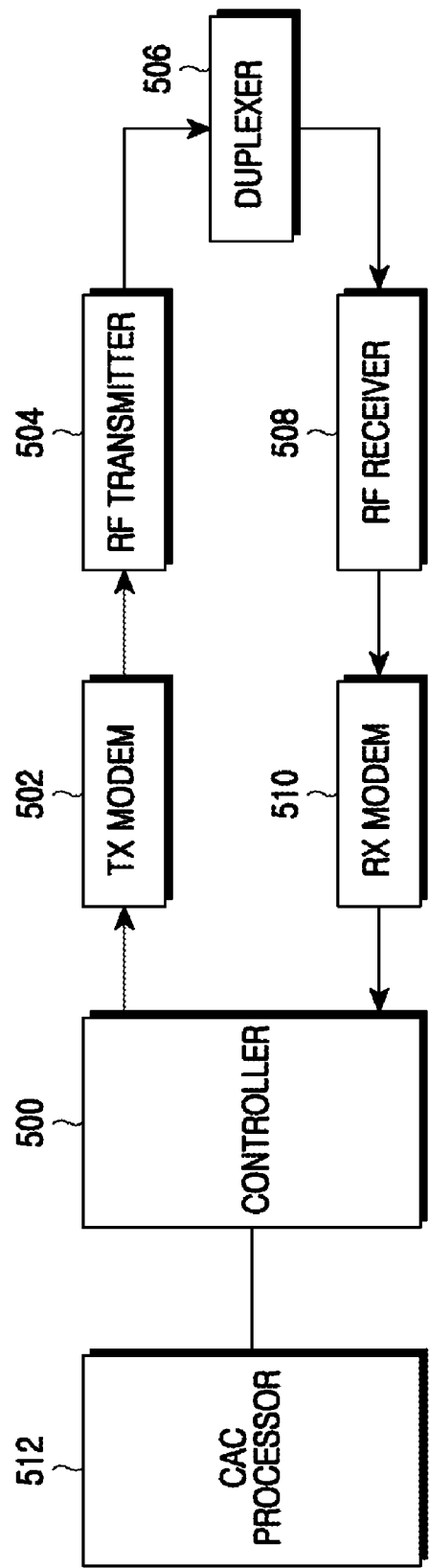
FIG. 5 is a block diagram of an RAS in a BWA system according to an exemplary embodiment of the present invention.

FIG. 5 is a block diagram of an RAS in a BWA system according to an exemplary embodiment of the present invention.

Referring to FIG. 5, the RAS includes a controller 500, a transmitting (TX) modem 502, a Radio Frequency (RF) transmitter 504, a duplexer 506, an RF receiver 508, a receiving (RX) modem 510, and a CAC processor 512.

The TX modem 502 includes a channel coding block and a modulation block, and converts a message received from the controller 500 into a baseband signal. The channel coding block may include a channel encoder, an interleaver, and a modulator. The modulation block may include an Inverse Fast Fourier Transform (IFFT) processor so that TX data can be carried over a plurality of orthogonal subcarriers. When using a CDMA system, the IFFT operator may be replaced with a code spreading modulator.

The RF transmitter 504 includes a frequency converter and an amplifier, and converts the baseband signal received from the TX modem 502 into an RF signal. According to a duplex scheme, the duplexer 506 transmits the signal transmitted from the RF transmitter 504 through an antenna, and provides the signal received through the antenna to the RF receiver 508. The RF receiver 508 includes an amplifier and a frequency converter, and converts the RF signal transmitted through a wireless channel into a baseband signal.

The RX modem 510 includes a demodulation block and a channel decoding block, and demodulates the signal received from the RF receiver 508 into a baseband signal. The demodulation block includes an FFT processor in order to extract data carried over each subcarrier. The channel decoding block includes a demodulator, a de-interleaver, and a channel decoder.

The controller 500 provides overall control for communication. For example, the controller 500 generates a signaling message to be transmitted to the TX modem 502, and analyzes the signaling message received from the RX modem 510. Also, the controller 500 generates data to be transmitted to the TX modem 502, and processes data received from the RX modem 510 according to a protocol. Also, when a connection admission request is detected, the controller 500 notifies the CAC processor 512.

The CAC processor 512 manages available system resources. Upon detecting a connection admission request, the CAC processor 512 determines whether to admit or deny the connection according to currently available resources, and reports the determination result to the controller 500. According to exemplary embodiments of the present invention, the CAC processor 512 determines an equivalent required bandwidth and an equivalent available bandwidth for a reference QoS class in consideration of traffic characteristics of various QoS classes and compares the equivalent required bandwidth and the equivalent available bandwidth to perform a CAC operation.

For example, the connection may be established by performing a Dynamic Service Addition (DSA) process. Upon receiving a DSA request message from a user terminal, the controller 500 analyzes the DSA request message and notifies the analysis result to the CAC processor 512. The CAC processor 512 uses the DSA request message to detect a QoS class of a required connection, and uses the QoS parameters of a corresponding SF to determine an application layer required bandwidth according to the detected QoS class. Thereafter, the CAC processor 512 determines a packet header overhead and a per-slot available bandwidth, and uses the application layer required bandwidth, the packet header overhead and the per-slot available bandwidth to determine an equivalent MAC layer required bandwidth for a reference QoS class. Also, the CAC processor 512 determines a signal overhead, determines an equivalent available bandwidth, uses the equivalent MAC layer required bandwidth and the equivalent available bandwidth to determine whether to admit the connection, and reports the determination result to the controller 500. The controller 500 generates a DSA response message according to the CAC result, and transmits the DSA response message to the user terminal.

As described above, exemplary embodiments of the present invention determine an equivalent required bandwidth and an equivalent available bandwidth for a reference QoS class in consideration of traffic characteristics of various QoS classes in the BWA system and compare the equivalent required bandwidth with the equivalent available bandwidth to perform a CAC operation, thereby making it possible to prevent unnecessary connection restriction or excessive connection admission when performing the CAC operation. Also, although the available bandwidth varies depending on the type of service traffic, exemplary embodiments of the present invention can easily estimate the available bandwidth for each traffic type by using the number of slots. Also, exemplary embodiments of the present invention can easily secure the service qualities by differentiating the connection priorities for the respective QoS classes and the connection priorities for handover calls and new calls.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims, and all differences within the scope will be construed as being included in the present invention.

What is claimed is:

1. A method for Connection Admission Control (CAC) in a Broadband Wireless Access (BWA) system, the method comprising:
   detecting a Quality of Service (QoS) class of a call requesting connection admission;
   determining an application layer required bandwidth by using the QoS parameters of a Service Flow (SF) of the detected QoS class;
   determining a required bandwidth weight of the QoS class in consideration of a packet header overhead;
   determining per-slot available bandwidths of a reference QoS class and the QoS class by using the determined application layer required bandwidth;
   determining a required bandwidth conversion ratio of a corresponding QoS class by using the determined per-slot available bandwidths; and
   determining an equivalent Media Access Control (MAC) layer required bandwidth by using the determined application layer required bandwidth, the required bandwidth weight, and the required bandwidth conversion ratio.

2. The method of claim 1, wherein the determining of the application layer required bandwidth comprises:
   if the QoS class is Unsolicited Grant Service (UGS), determining the application layer required bandwidth by using the Maximum Sustained Traffic Rate among the QoS parameters of the corresponding QoS class;
   if the QoS class is extended real-time Polling Service (ertPS), determining the application layer required bandwidth by using at least one of the Maximum Sustained Traffic Rate and the Minimum Reserved Traffic Rate among the QoS parameters of the corresponding QoS class; and
   if the QoS class is real-time Polling Service (rtPS) or non-real-time Polling Service (nrtPS), determining the application layer required bandwidth by using the Minimum Reserved Traffic Rate among the QoS parameters of the corresponding QoS class.

3. The method of claim 1, wherein the packet header overhead comprises at least one of Generic MAC Header (GMH), Cyclic Redundancy Check (CRC), Packing Sub-Header (PSH), Fragmentation Sub-Header (FSH), and Traffic Encryption Key (TEK).

4. The method of claim 1, wherein the required bandwidth weight is determined using at least one of the packet header overhead, characteristics of the QoS class, the application layer required bandwidth, and a padding-caused overhead.

5. The method of claim 1, wherein the per-slot available bandwidth of the QoS class is determined using the following equation:

$$\Delta C(QoS\_class) = \frac{\sum_i BW_{req}(i)}{n(QoS\_class)}$$

where $\Delta C(QoS\_class)$ denotes the per-slot available bandwidth of the QoS class, $BW_{req}$ denotes the application layer required bandwidth, $$\sum_i BW_{req}(i)$$

denotes the sum of the application layer required bandwidths of all SFs of the QoS class that is being served as a result of CAC, i denotes a SF index, and n(QoS_class) denotes the number of slots that used to serve all SFs of the QoS class during a time period given when transmitting a MAC frame from a modem by air.

6. The method of claim 5, wherein the required bandwidth conversion ratio is determined using the following equation:

$$\beta(QoS\_class) = \frac{\Delta C(QoS\_class)}{\Delta C(\text{reference } QoS\_class)}$$

where $\beta(QoS\_class)$ denotes the required bandwidth conversion ratio of the QoS class, $\Delta C(QoS\_class)$ denotes the per-slot available bandwidth of the QoS class, and $\Delta C(\text{reference } QoS\_class)$ denotes the per-slot available bandwidth of the reference QoS class.

7. The method of claim 6, wherein the equivalent required bandwidth is determined using the following equation:

$$C_{eq} = BW_{req} * (1 + \alpha(\text{application } SF))/\beta(QoS\_class)$$

where $C_{eq}$ denotes the equivalent required bandwidth, $BW_{req}$ denotes the application layer required bandwidth, $\alpha(\text{application } SF)$ denotes the required bandwidth weight of the QoS class, which is greater than 0, and $\beta(QoS\_class)$ denotes the required bandwidth conversion ratio of the QoS class.

8. The method of claim 1, wherein the reference QoS class comprises Unsolicited Grant Service (UGS).

9. The method of claim 1, wherein determining of the signal overhead of the QoS class comprises:

determining an available bandwidth by excluding, from the entire slots, a slot allocated to the determined signal overhead and a slot allocated to a data burst of all the QoS SFs except Best Effort (BE);

determining an equivalent available bandwidth by using the determined available bandwidth and the per-slot available bandwidth of the reference QoS class; and performing a CAC operation by comparing the determined equivalent required bandwidth and the equivalent available bandwidth.

10. The method of claim 9, wherein the signal overhead comprises at least one of a Multicast and Broadcast Service (MBS) supporting overhead, a sleep or idle mode user supporting overhead, a preamble, DL/UL MAP, a broadcasting message, a UL control channel, a bandwidth allocation request, Dynamic Service Add (DSA)/Dynamic Service Change (DSC)/Dynamic Service Deletion (DSD), RObust Header Compression (ROHC) feedback signals, and ARQ ACK.

11. The method of claim 9, wherein the equivalent available bandwidth is determined using the following equation:

$$C_a = N_a * \Delta C(\text{reference } QoS\_class)$$

where $C_a$ denotes the equivalent available bandwidth, $N_a$ denotes the available bandwidth, and $\Delta C(\text{reference } QoS\_class)$ denotes the per-slot available bandwidth of the reference QoS class.

12. The method of claim 9, wherein the determined equivalent required bandwidth and the equivalent available bandwidth are compared using the following equation:

$$C_{eq} < K C_a$$

where $C_{eq}$ denotes the equivalent required bandwidth, $C_a$ denotes the equivalent available bandwidth, and K is a constant value smaller than 1, which is set differently depending on the QoS class of a corresponding call and whether the corresponding call is a new call or a handover call.

13. An apparatus for Connection Admission Control (CAC) in a Broadband Wireless Access (BWA) system, the apparatus comprising:

a controller for determining whether there is a call requesting connection admission; and a CAC processor for detecting a Quality of Service (QoS) class of the call requesting connection admission, for determining an application layer required bandwidth by using the QoS parameters of a Service Flow (SF) of the detected QoS class, for determining a required bandwidth weight of the QoS class in consideration of a packet header overhead, for determining per-slot available bandwidths of a reference QoS class and the QoS class by using the determined application layer required bandwidth, for determining a required bandwidth conversion ratio of a corresponding QoS class by using the determined per-slot available bandwidths, and for determining an equivalent Media Access Control (MAC) layer required bandwidth by using the determined application layer required bandwidth, the required bandwidth weight, and the required bandwidth conversion ratio.

14. The apparatus of claim 13, wherein the CAC processor determines, if the QoS class is Unsolicited Grant Service (UGS), the application layer required bandwidth by using the Maximum Sustained Traffic Rate among the QoS parameters of the corresponding QoS class, determines, if the QoS class is extended real-time Polling Service (ertPS), the application layer required bandwidth by using at least one of the Maximum Sustained Traffic Rate and the Minimum Reserved Traffic Rate among the QoS parameters of the corresponding QoS class and determines, if the QoS class is real-time Polling Service (rtPS) or non-real-time Polling Service (nrtPS), the application layer required bandwidth by using the Minimum Reserved Traffic Rate among the QoS parameters of the corresponding QoS class.

15. The apparatus of claim 13, wherein the packet header overhead comprises at least one of Generic MAC Header (GMH), Cyclic Redundancy Check (CRC), Packing Sub-Header (PSH), Fragmentation Sub-Header (FSH), and Traffic Encryption Key (TEK).

16. The apparatus of claim 13, wherein the required bandwidth weight is determined using at least one of the packet header overhead, characteristics of the QoS class, the application layer required bandwidth, and a padding-caused overhead.

17. The apparatus of claim 13, wherein the per-slot available bandwidth of the QoS class is determined using the following equation:

$$\Delta C(QoS\_class) = \frac{\sum_i BW_{req}(i)}{n(QoS\_class)}$$

where $\Delta C(QoS\_class)$ denotes the per-slot available bandwidth of the QoS class, $BW_{req}$ denotes the application layer required bandwidth, $$\sum_i BW_{req}(i)$$

denotes the sum of the application layer required bandwidths of all SFs of the QoS class that is being served as a result of CAC, i denotes a SF index, and $n(QoS\_class)$ denotes the number of slots that used to serve all SFs of the QoS class during a time period given when transmitting a MAC frame from a modem by air.

18. The apparatus of claim 17, wherein the required bandwidth conversion ratio is determined using the following equation:

$$\beta(QoS\_class) = \frac{\Delta C(QoS\_class)}{\Delta C(\text{reference } QoS\_class)}$$

where $\beta(QoS\_class)$ denotes the required bandwidth conversion ratio of the QoS class, $\Delta C(QoS\_class)$ denotes the per-slot available bandwidth of the QoS class, and $\Delta C(\text{reference } QoS\_class)$ denotes the per-slot available bandwidth of the reference QoS class.

19. The apparatus of claim 18, wherein the equivalent required bandwidth is determined using the following equation:

$$C_{eq}=BW_{req}*(1+\alpha(\text{application } SF))/\beta(QoS\_class)$$

where $C_{eq}$ denotes the equivalent required bandwidth, $BW_{req}$ denotes the application layer required bandwidth, $\alpha(\text{application SF})$ denotes the required bandwidth weight of the QoS class, which is greater than 0, and $\beta(QoS\_class)$ denotes the required bandwidth conversion ratio of the QoS class.

20. The apparatus of claim 13, wherein the reference QoS class comprises Unsolicited Grant Service (UGS).

21. The apparatus of claim 13, wherein the CAC processor determines an available bandwidth by excluding, from the entire slots, a slot allocated to the determined signal overhead and a slot allocated to a data burst of all the QoS SFs except Best Effort (BE), determines an equivalent available bandwidth by using the determined available bandwidth and the per-slot available bandwidth of the reference QoS class and performs a CAC operation by comparing the determined equivalent required bandwidth and the equivalent available bandwidth.

22. The apparatus of claim 21, wherein the signal overhead comprises at least one of a Multicast and Broadcast Service (MBS) supporting overhead, a sleep or idle mode user supporting overhead, a preamble, DL/UL MAP, a broadcasting message, a UL control channel, a bandwidth allocation request, Dynamic Service Add (DSA)/Dynamic Service Change (DSC)/Dynamic Service Deletion (DSD), RObust Header Compression (ROHC) feedback signals, and ARQ ACK.

23. The apparatus of claim 21, wherein the equivalent available bandwidth is determined using the following equation:

$$C_a=N_a*\Delta C(\text{reference } QoS\_class)$$

where $C_a$ denotes the equivalent available bandwidth, $N_a$ denotes the available bandwidth, and $\Delta C(\text{reference } QoS\_class)$ denotes the per-slot available bandwidth of the reference QoS class.

24. The apparatus of claim 22, wherein the determined equivalent required bandwidth and the equivalent available bandwidth are compared using the following equation:

$$C_{eq}<KC_a$$

where $C_{eq}$ denotes the equivalent required bandwidth, $C_a$ denotes the equivalent available bandwidth, and K is a constant value smaller than 1, which is set differently depending on the QoS class of a corresponding call and whether the corresponding call is a new call or a handover call.

* * * * *